United States Patent
Li et al.

(10) Patent No.: US 12,103,879 B2
(45) Date of Patent: *Oct. 1, 2024

(54) METHOD FOR ADVANCED NITROGEN AND PHOSPHORUS REMOVAL IN SEWAGE TREATMENT

(71) Applicant: YUNNAN HEXU ENVIRONMENTAL TECHNOLOGY CO., LTD., Yunnan (CN)

(72) Inventors: Wensheng Li, Yunnan (CN); Jianmin Zhang, Yunnan (CN); Jun Yang, Yunnan (CN); Weihua Chen, Yunnan (CN); Zhishuai Wang, Yunnan (CN); Hongchang Zhou, Yunnan (CN); Peng Deng, Yunnan (CN); Jing Liao, Yunnan (CN)

(73) Assignee: YUNNAN HEXU ENVIRONMENTAL TECHNOLOGY CO., LTD., Dali Bai Autonomous Prefecture (CN)

( * ) Notice: Subject to any disclaimer, the term of this patent is extended or adjusted under 35 U.S.C. 154(b) by 464 days.

This patent is subject to a terminal disclaimer.

(21) Appl. No.: 17/488,420

(22) Filed: Sep. 29, 2021

(65) Prior Publication Data

US 2022/0017393 A1 Jan. 20, 2022

Related U.S. Application Data

(63) Continuation-in-part of application No. PCT/CN2019/091496, filed on Jun. 17, 2019.

(30) Foreign Application Priority Data

Mar. 29, 2019 (CN) .......................... 201910251280.6

(51) Int. Cl.
*C02F 3/30* (2023.01)
*C02F 1/00* (2023.01)
(Continued)

(52) U.S. Cl.
CPC .............. *C02F 3/308* (2013.01); *C02F 3/104* (2013.01); *C02F 3/109* (2013.01); *C02F 3/303* (2013.01);
(Continued)

(58) Field of Classification Search
CPC .......... C02F 3/109; C02F 3/308; C02F 3/104; C02F 3/303; C02F 3/305; C02F 1/32;
(Continued)

(56) References Cited

U.S. PATENT DOCUMENTS

2016/0096755 A1* 4/2016 Slusarczyk ............. C02F 3/308
210/605

FOREIGN PATENT DOCUMENTS

CN 1622921 A 6/2005
CN 101531444 A 9/2009
(Continued)

OTHER PUBLICATIONS

Ashrafi, et. al, Optimising nutrient removal of a hybrid five-stage Bardenpho and moving bed biofilm reactor process using response surface methodology, Journal of Environmental Chemical Engineering, vol. 7, Issue 1, 2019. (Year: 2019).*
(Continued)

*Primary Examiner* — Bradley R Spies
*Assistant Examiner* — Jeannie McDermott

(57) ABSTRACT

A method for advanced nitrogen and phosphorus removal in sewage treatment includes the following steps: feeding raw water and return sludge into a pre-denitrification zone for denitrification; allowing a sludge-containing mixed liquor discharged from the pre-denitrification zone to enter an (Continued)

anaerobic zone to undergo a biological phosphorus removal reaction; allowing a sludge-containing mixed liquor discharged from the anaerobic zone and a return nitrification liquid to enter an anoxic zone for denitrification; allowing a sludge-containing mixed liquor discharged from the anoxic zone to enter an aerobic zone for nitrification and excessive phosphorus uptake, and allowing part of a nitrification liquid to be returned to the anoxic zone; allowing a sludge-containing mixed liquor discharged from the aerobic zone to enter a sedimentation zone for separation; passing a resulting supernatant through a biological filtration zone; returning part of resulting sludge to the pre-denitrification zone; and the like.

13 Claims, 7 Drawing Sheets

(51) Int. Cl.
    *C02F 1/32*    (2023.01)
    *C02F 1/50*    (2023.01)
    *C02F 3/10*    (2023.01)
    *C02F 101/10*  (2006.01)
    *C02F 101/16*  (2006.01)

(52) U.S. Cl.
    CPC ........ *C02F 3/305* (2013.01); *C02F 2001/007* (2013.01); *C02F 1/32* (2013.01); *C02F 1/50* (2013.01); *C02F 2101/105* (2013.01); *C02F 2101/16* (2013.01); *C02F 2201/005* (2013.01); *C02F 2301/046* (2013.01); *C02F 2303/04* (2013.01); *C02F 2303/16* (2013.01)

(58) Field of Classification Search
    CPC ............................ C02F 1/50; C02F 2001/007; C02F 2101/105; C02F 2101/16; C02F 2201/005; C02F 2301/046; C02F 2303/04; C02F 2303/16; C02F 3/302; C02F 3/085; C02F 3/108; C02F 11/12; Y02W 10/10
    See application file for complete search history.

(56) References Cited

FOREIGN PATENT DOCUMENTS

| CN | 104003520 A | * | 8/2014 |
| CN | 104355503 A | | 2/2015 |
| CN | 105217890 A | * | 1/2016 |
| CN | 105293834 A | | 2/2016 |
| CN | 205442950 U | | 8/2016 |
| CN | 106986453 A | | 7/2017 |
| CN | 108423826 A | | 8/2018 |
| CN | 109879425 A | | 6/2019 |

OTHER PUBLICATIONS

International Search Report of PCT Patent Application No. PCT/CN2019/091496 issued on Dec. 31, 2019.

* cited by examiner

METHOD FOR ADVANCED NITROGEN AND PHOSPHORUS REMOVAL IN SEWAGE TREATMENT

CROSS REFERENCE TO RELATED APPLICATIONS

The present application is a Continuation-In-Part Application of PCT Application No. PCT/CN2019/091496 filed on Jun. 17, 2019, which claims the benefit of Chinese Patent Application No. 201910251280.6 filed on Mar. 29, 2019. All the above are hereby incorporated by reference in their entirety.

TECHNICAL FIELD

The present disclosure relates to the technical field of sewage treatment, and in particular to a method for advanced nitrogen and phosphorus removal in sewage treatment.

BACKGROUND

With the development of social economy and the improvement of people's living standards, the contents of nitrogen and phosphorus in domestic sewage continue to increase, and resulting water eutrophication is also becoming increasingly serious. Microbial nitrogen and phosphorus removal features energy efficient and environmental friendliness, is favored by global researchers and is widely used in sewage treatment. Due to the demand of microbial growth and metabolism, the processes of biological denitrification and phosphorus uptake are accompanied by the consumption of organic carbon sources. However, there is generally a low carbon source concentration in domestic sewage and polluted water, which poses a negative impact on the removal efficiency of nitrogen and phosphorus. For example, in a traditional anaerobic/anoxic/oxic ($A^2O$) process, denitrification of nitrate nitrogen in return sludge and denitrification of nitrate nitrogen in nitrification return liquid are conducted in the anoxic tank and the anaerobic tank, respectively. When the carbon source in sewage is insufficient, nitrate nitrogen in return sludge in the anaerobic tank will consume organic matters and thus inhibit the release of phosphorus by phosphate-accumulating organisms (PAOs). In addition, nitrate nitrogen will be used by some PAOs as an electron acceptor for denitrification, which obviously interferes with the process of acidogenic fermentation with fermentation intermediates as electron acceptors, and consequently negatively affect the phosphorus release and phosphorus uptake processes of PAOs. Therefore, how to reduce the impact of nitrate nitrogen on phosphorus removal at a low carbon source concentration and take into account both high-efficiency nitrogen removal and high-efficiency phosphorus removal has become a key technical issue in the field of water treatment, and it is urgent to innovate and optimize the traditional sewage treatment processes.

SUMMARY

The technical problem to be solved by the present disclosure is to provide a method for advanced nitrogen and phosphorus removal in sewage treatment, which can avoid the interference of nitrate nitrogen in return sludge on biological phosphorus removal. Even when there is a low C/N ratio (namely, carbon-nitrogen ratio) and a low C/P ratio (namely, carbon-phosphorus ratio) in influent water, the method can improve the efficiency of phosphorus and nitrogen removal while reducing chemical oxygen demand (COD). The present disclosure achieves the above objective by setting up a pre-denitrification zone, filling an anoxic zone, an aerobic zone, and a biological filtration zone with a preferred filler for biochemical treatment and biological filtration, and adopting step feed or a chemical phosphorus removal process.

The present disclosure provides a method for advanced nitrogen and phosphorus removal in sewage treatment, including the following steps:

a. feeding raw water into a pre-denitrification zone, or feeding the raw water into the pre-denitrification zone and an anaerobic zone through step feed;

b. allowing sludge returned from a sedimentation zone to enter the pre-denitrification zone to undergo denitrification;

c. allowing a sludge-containing mixed liquor obtained after the denitrification in the pre-denitrification zone to enter the anaerobic zone to undergo a biological phosphorus removal reaction;

d. allowing a sludge-containing mixed liquor discharged from the anaerobic zone to enter an anoxic zone filled with a suspended filler, such that the sludge-containing mixed liquor is mixed with a nitrification liquid returned from an aerobic zone to the anoxic zone for denitrification;

e. allowing a sludge-containing mixed liquor obtained after the denitrification in the anoxic zone to enter an aerobic zone filled with a suspended filler for organic matter degradation, ammonia nitrogen nitrification, and excessive phosphorus uptake, and allowing part of a nitrification liquid to be returned from the aerobic zone to the anoxic zone;

f. allowing a sludge-containing mixed liquor discharged from the aerobic zone to enter the sedimentation zone for sedimentation to obtain a supernatant and sludge; filtering the supernatant through a biological filtration zone filled with a filler to further remove suspended solid particles; and returning part of the sludge from the sedimentation zone to the pre-denitrification zone, and discharging the remaining sludge outwards; and g. allowing clear water obtained after the filtration through the biological filtration zone to enter a clear water zone.

As a preferred solution of the present disclosure, the step feed may include: feeding one part of the raw water into the pre-denitrification zone to provide a carbon source for denitrification of nitrate nitrogen in the raw water and return sludge; and feeding the other part of the raw water into the anaerobic zone in which the raw water is mixed with the sludge-containing mixed liquor obtained after the denitrification in the pre-denitrification zone for the biological phosphorus removal reaction.

As a preferred solution of the present disclosure, the raw water entering the pre-denitrification zone may account for 5% to 30% of the total raw water fed, and the raw water entering the anaerobic zone may account for 70% to 95% of the total raw water fed.

As a preferred solution of the present disclosure, the filler in the anoxic zone may be a sponge or a plastic particle; the sponge may be a cube with a side length of 0.5 cm to 5 cm; and the plastic particle may be a cylinder with a diameter of 0.5 cm to 3 cm and a height of 0.5 cm to 5 cm, or the plastic particle may be a cuboid with a side length of 0.5 cm to 5 cm.

As a preferred solution of the present disclosure, the filler in the aerobic zone may be a sponge or a plastic particle; the sponge may be a cube with a side length of 0.5 cm to 5 cm; and the plastic particle may be a cylinder with a diameter of 0.5 cm to 3 cm and a height of 0.5 cm to 5 cm, or the plastic particle may be a cuboid with a side length of 0.5 cm to 5 cm.

As a preferred solution of the present disclosure, a ratio of a volume of the filler in the aerobic zone to a volume of the aerobic zone may be 0.2 to 0.6.

As a preferred solution of the present disclosure, the anoxic zone may be composed of at least one anoxic tank, and if there are two or more anoxic tanks, the two or more anoxic tanks may communicate with each other in sequence; and the aerobic zone may be composed of at least one aerobic tank, and if there are two or more aerobic tanks, the two or more aerobic tanks may communicate with each other in sequence.

As a preferred solution of the present disclosure, a water outlet of the anoxic zone and a water outlet of the aerobic zone may be both provided with a filler baffle; a strip hole may be formed on the filler baffle; and the filler baffle may be partly above a liquid level.

As a preferred solution of the present disclosure, a PAC chemical phosphorus removal process may be adopted at a tail end of the aerobic zone.

As a preferred solution of the present disclosure, the clear water zone may be provided with a tablet disinfection process or an ultraviolet (UV) disinfection process.

As a preferred solution of the present disclosure, a filler layer may be provided in the biological filtration zone, and the filler layer may divide a cavity in the biological filtration zone to form an upper water inlet cavity and a lower water outlet cavity; the water inlet cavity may communicate with a top of the sedimentation zone, and the water outlet cavity may communicate with a bottom of the clear water zone; a backwash aeration pipe may be provided in the water outlet cavity, and a backwash water outlet may be formed in the water inlet cavity; and the backwash water outlet may be connected to a sludge concentration and storage tank or the pre-denitrification zone.

Further, a height of the filler layer may account for 20% to 70% of a height of the biological filtration zone.

Further, a filler in the filler layer may be a sponge or a plastic particle; the sponge may be a cube with a side length of 0.1 cm to 3 cm; and the plastic particle may be a cylinder with a diameter of 0.1 cm to 3 cm and a height of 0.1 cm to 5 cm, or the plastic particle may be a cuboid with a side length of 0.1 cm to 3 cm.

Further, the filler layer may be provided with an upper cover plate; and a filler feeding port with a diameter of 90 mm to 400 mm may be formed on the upper cover plate.

Further, a solenoid valve may be provided at an air inlet end of the backwash aeration pipe.

Further, the backwash water outlet may be close to an upper surface of the filler layer.

Further, the backwash water outlet may be connected to the sludge concentration and storage tank or the pre-denitrification zone through an air stripping device.

Further, pneumatic gas sources of the backwash aeration pipe and the air stripping device may be provided by the same air pump or fan.

Compared with the prior art, the implementation of the method for advanced nitrogen and phosphorus removal in sewage treatment according to the present disclosure has the following beneficial effects:

A pre-denitrification zone is added before an anaerobic zone, a carbon source in the raw water is used to achieve denitrification of nitrate nitrogen in the raw water and the return sludge in the pre-denitrification zone, and the return sludge enters the anaerobic zone to undergo a biological phosphorus removal reaction, which avoids the interference of nitrate nitrogen on biological phosphorus removal. Both anoxic and aerobic zones are filled with a preferred filler, which can effectively increase a biomass, help to solve a sludge age contradiction between phosphorus removal and nitrogen removal, and simultaneously promote nitrification denitrification and biological phosphorus removal. When step feed is provided, one part of the raw water enters the anaerobic zone to provide a carbon source for biological phosphorus removal, which reduces COD and simultaneously improves the efficiency of phosphorus and nitrogen removal for sewage with low C/N and C/P ratios. A biological filtration zone is provided between the sedimentation zone and the clear water zone, which can further effectively remove suspended solid particles (SS) and achieve advanced nitrogen removal.

BRIEF DESCRIPTION OF THE DRAWINGS

In order to explain the technical solutions of the examples of the present disclosure more clearly, accompanying drawings of the examples will be briefly introduced below.

Figure 1:
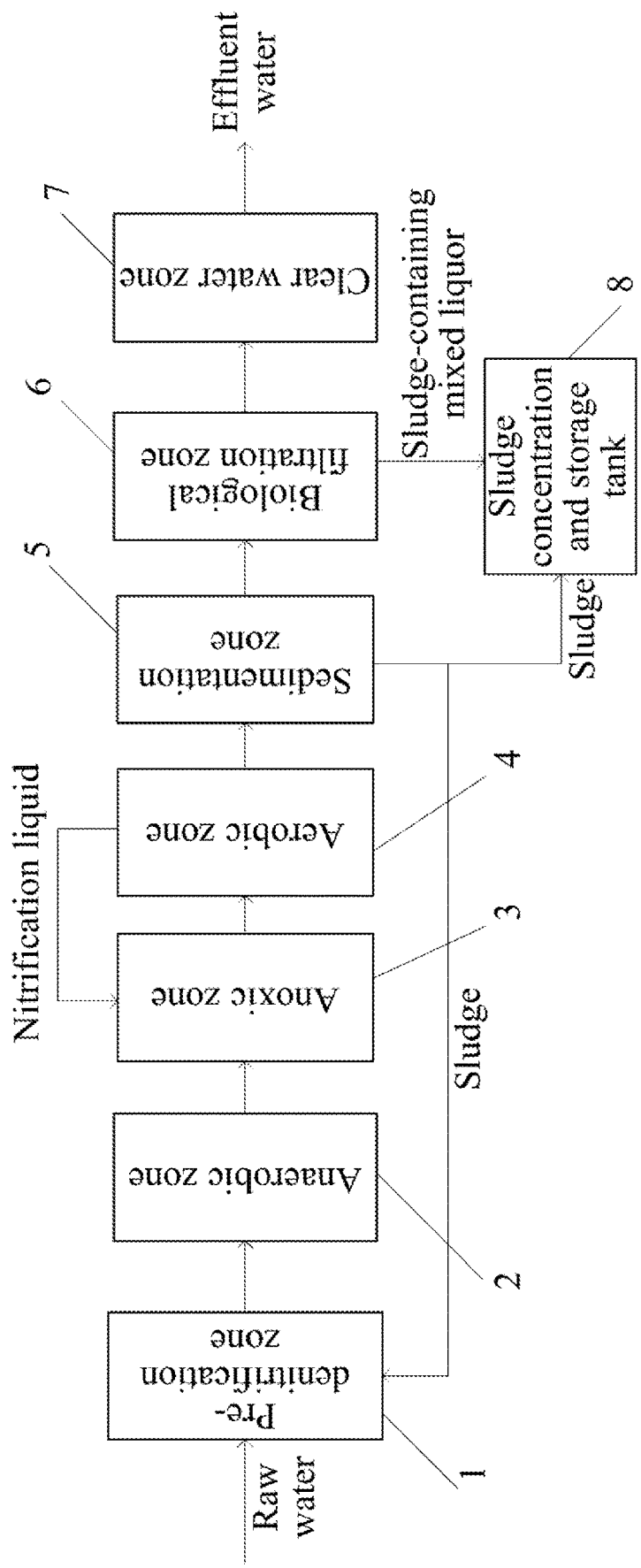
FIG. 1 is a process flow chart of the method for advanced nitrogen and phosphorus removal in sewage treatment provided by the present disclosure, where a sludge-containing mixed liquor obtained after backwash in the biological filtration zone flows through the backwash water outlet to the sludge concentration and storage tank.

Reference numerals in the figures: 1: pre-denitrification zone; 2: anaerobic zone; 23: carbon source addition device; 3: anoxic zone; 30: anoxic tank; 4: aerobic zone; 40: aerobic tank; 5: sedimentation zone; 6: biological filtration zone; 61: filler layer; 62: water inlet cavity; 63: water outlet cavity; 64: backwash aeration pipe; 65: backwash water outlet; 66: upper cover plate; 67: filler feeding port; 68: air stripping device; 7: clear water zone; 8: sludge concentration and storage tank; 9: filler baffle; and 91: strip hole.

DETAILED DESCRIPTION

The technical solutions in the examples of the present disclosure are clearly and completely described below with reference to the accompanying drawings in the examples of the present disclosure. Apparently, the described examples are merely a part rather than all of the examples of the present disclosure. All other examples obtained by a person of ordinary skill in the art based on the examples of the present disclosure without creative efforts shall fall within the protection scope of the present disclosure.

Figure 2:
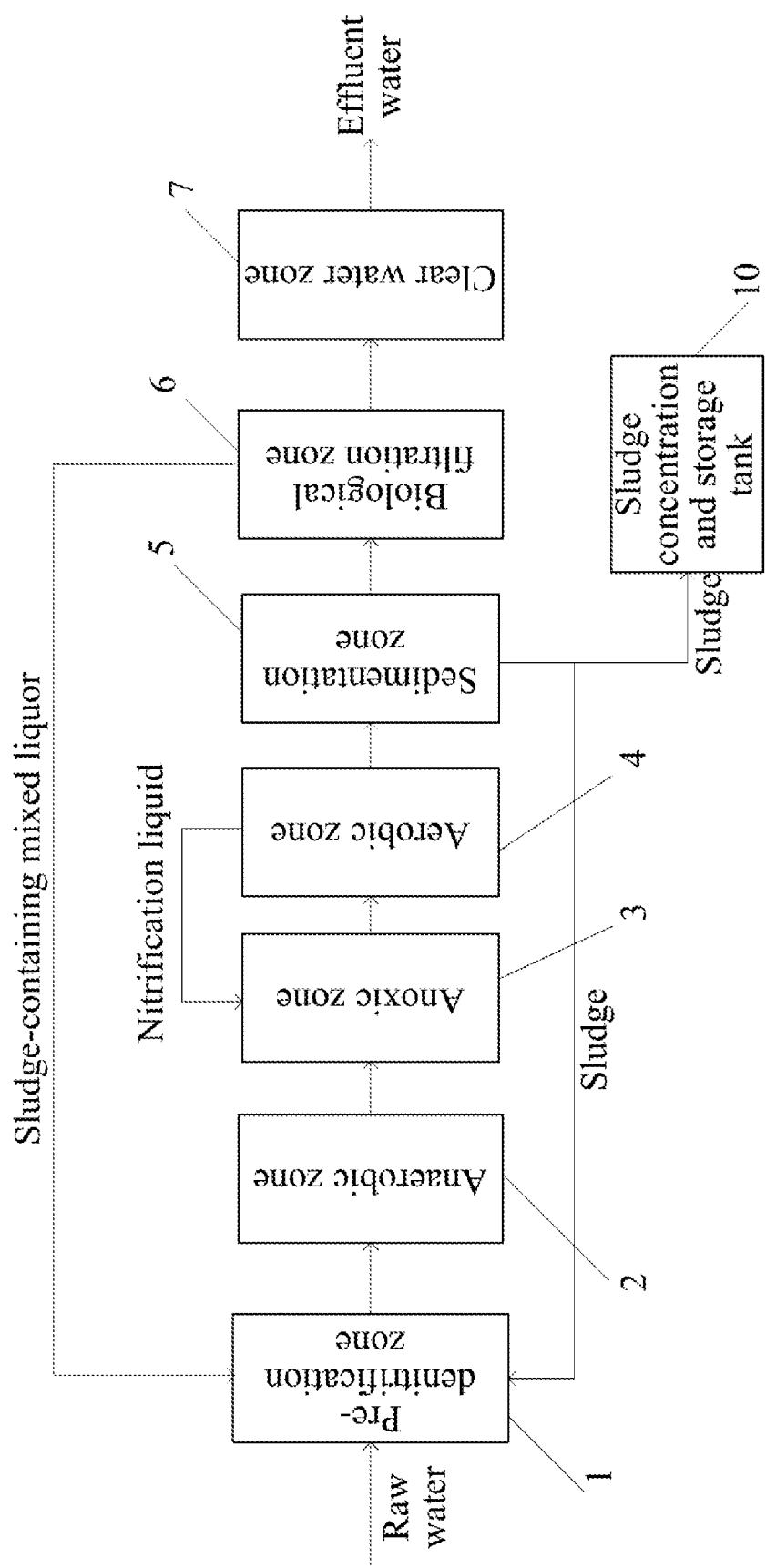
FIG. 2 is another process flow chart of the method for advanced nitrogen and phosphorus removal in sewage treatment provided by the present disclosure, where a sludge-containing mixed liquor obtained after backwash in the biological filtration zone flows through the backwash water outlet to the pre-denitrification zone.

As shown in FIG. 1 and FIG. 2, a preferred example of the method for advanced nitrogen and phosphorus removal in sewage treatment provided by the present disclosure includes the following steps:

a. Raw water enters the pre-denitrification zone 1, and the organic matter in the raw water is used to conduct denitrification on nitrate nitrogen in sludge returned from the sedimentation zone 5 to the pre-denitrification zone 1. It should be noted that the pre-denitrification zone 1 is provided to receive the inflow sewage (namely, raw water) from an adjusting tank and return sludge from the sedimentation zone 5 and fully remove nitrate and oxygen in the inflow sewage and return sludge under anoxic conditions, thereby creating a strict anaerobic environment in the anaerobic zone and strengthening the anaerobic phosphorus release effect of PAOs;

b. a sludge-containing mixed liquor obtained after the denitrification in the pre-denitrification zone 1 enters the anaerobic zone 2 to undergo a biological phosphorus removal reaction. It should be noted that the anaerobic zone 2 is provided to greatly improve the phosphorus release efficiency of PAOs in a strict anaerobic environment and make the phosphorus absorption efficiency in the aerobic zone 4 fully improved. The anaerobic zone is provided mainly to cooperate with the aerobic zone for phosphorus removal;

c. a sludge-containing mixed liquor discharged from the anaerobic zone 2 enters the anoxic zone 3 to undergo denitrification with a nitrification liquid returned from the aerobic zone 4 to the anoxic zone 3. It should be noted that the anoxic zone 3 is provided to fully utilize denitrifying bacteria suspended and fixed on a filler to reduce nitrate into nitrogen with nitrogen in nitrate as an electron acceptor at a relatively-low dissolved oxygen concentration, thereby realizing the denitrification of sewage. Moreover, denitrification can provide partial alkalinity, which provides favorable conditions for subsequent aerobic zone nitrification. Thus, the anoxic zone 3 mainly realizes the function of denitrification;

d. a sludge-containing mixed liquor obtained after the denitrification in the anoxic zone 3 enters the aerobic zone 4 for nitrification, and part of the nitrification liquid is returned from the aerobic zone 4 to the anoxic zone 3. It should be noted that the aerobic zone 4 is provided to make suspended activated sludge and microorganisms fixed on a filler use one part of organic matters in the sewage to synthesize new cells and catabolize the other part of the organic matters to obtain energy necessary for cell synthesis under aerobic conditions, where final products are stable substances such as $CO_2$ and $H_2O$. While the organic matters are oxidized, the organic nitrogen and free ammonia nitrogen in the sewage are gradually converted into nitrites and nitrates under sufficient dissolved oxygen. PAOs excessively absorb phosphorus in the sewage to form high-concentration phosphorus-containing sludge. Thus, the aerobic zone 4 mainly realizes the functions of organic matter degradation, ammonia nitrogen nitrification, and excessive phosphorus uptake;

e. a sludge-containing mixed liquor discharged from the aerobic zone 4 enters the sedimentation zone for sedimentation to obtain a supernatant and sludge; the supernatant is filtered in the biological filtration zone 6 to remove SS; and part of the sludge is returned from the sedimentation zone 5 to the pre-denitrification zone 1 to maintain a sludge concentration in the system, and the remaining sludge is discharged to the sludge concentration and storage tank 8 or the pre-denitrification zone 1, thereby achieving the biological phosphorus removal effect;

f. clear water obtained after the filtration through the biological filtration zone 6 enters a clear water zone 7.

The present disclosure adds a pre-denitrification zone 1 before the anaerobic zone 2, nitrate nitrogen in return sludge in the pre-denitrification zone 1 undergoes denitrification with the raw water, and then the return sludge enters the anaerobic zone 2 to undergo a biological phosphorus removal reaction, which avoids the interference of nitrate nitrogen in the return sludge on biological phosphorus removal, and reduces COD and improves the efficiency of phosphorus and nitrogen removal especially for sewage with low C/N and C/P ratios. Moreover, the present disclosure provides a biological filtration zone 6 between the sedimentation zone 5 and the clear water zone 7 to effectively remove SS and achieve advanced denitrification.

It should also be noted that a nitrification liquid is returned from the aerobic zone 4 to the anoxic zone 3 in the present disclosure, but a nitrification liquid is returned from the sedimentation zone to the anoxic zone in the prior art; and thus compared with the prior art, the present disclosure can make a flow rate of a mixed liquor entering the sedimentation zone smaller, sludge sedimentation and separation better, and device layout simpler.

Figure 3:
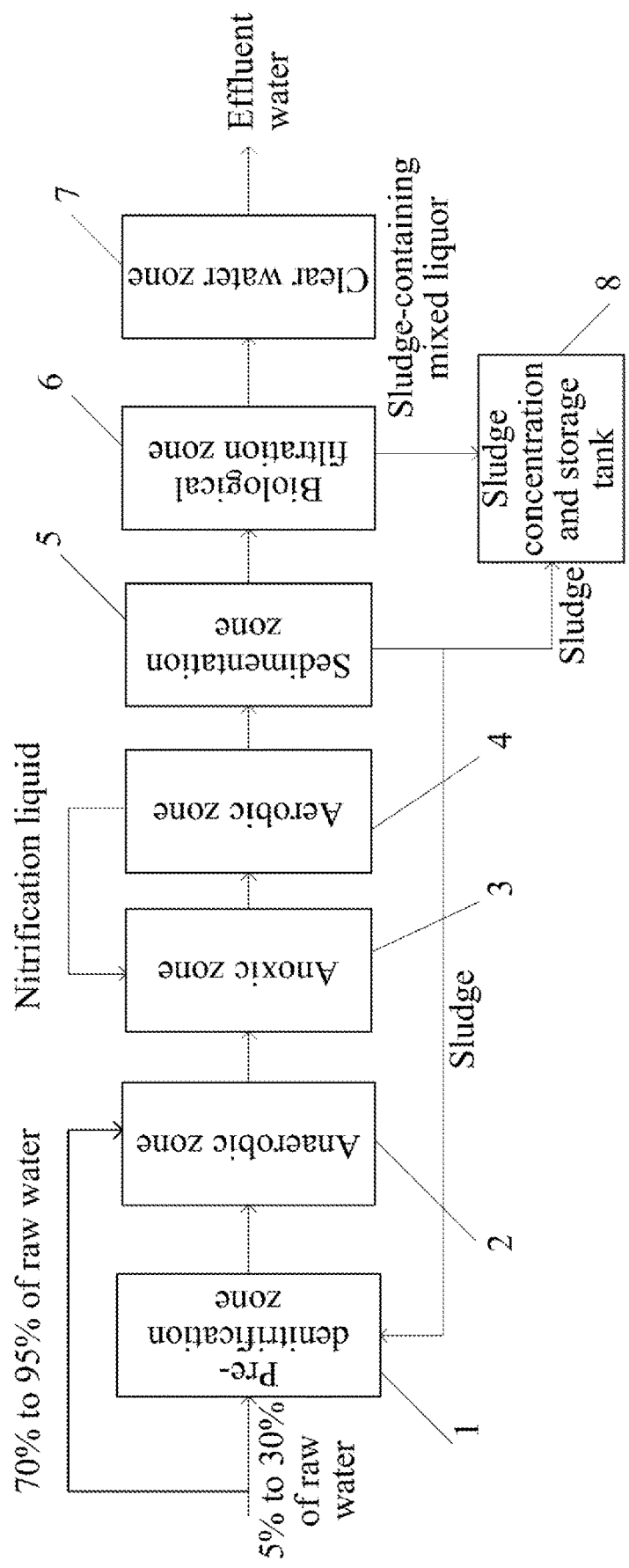
FIG. 3 is a process flow chart of the method for advanced nitrogen and phosphorus removal in sewage treatment provided by the present disclosure, where step feed is adopted for the pre-denitrification zone and the anaerobic zone.

Exemplarily, as shown in FIG. 3, in order to clarify the functional division of the pre-denitrification zone 1 and the anaerobic zone 2, a step feed process is proposed. The step feed provided for the pre-denitrification zone 1 and anaerobic zone 2 is as follows: according to influent water concentration distribution, one part of the raw water (accounting for 5% to 30% of the total raw water fed) enters the pre-denitrification zone 1, and the organic matters in the raw water undergo complete denitrification with nitrate nitrogen in sludge returned from the sedimentation zone 5 to the pre-denitrification zone 1; and the other part of the raw water (accounting for 70% to 95% of the total raw water fed) enters the anaerobic zone 2 and is mixed with the sludge-containing mixed liquor obtained after the denitrification in the pre-denitrification zone 1 to provide PAOs with sufficient carbon sources for phosphorus removal, thereby promoting the biological phosphorus removal reaction. Based on the above method, the total phosphorus removal efficiency for sewage with low C/N and C/P ratios can be increased from about 80% to about 90%, and the total nitrogen removal efficiency can be increased by about 5% and approach 80%.

Exemplarily, a filler, such as a sponge or a plastic particle, is filled in the anoxic zone 3. The sponge may preferably be a polyurethane (PU) sponge, which may be a cube with a side length of 0.5 cm to 5 cm; and the plastic particle may preferably be a polypropylene (PP) particle, which may be a cylinder with a diameter of 0.5 cm to 3 cm and a height of 0.5 cm to 5 cm or may be a cuboid with a side length of 0.5 cm to 5 cm. The arrangement of the sponge or plastic particle provides an excellent carrier for the growth of microorganisms, accelerates the growth of microorganisms, increases a denitrification rate in the anoxic zone 3, and reduces a tank volume.

Exemplarily, a filler, such as a sponge or a plastic particle, is filled in the aerobic zone 4. The sponge may preferably be a PU sponge, which may be a cube with a side length of 0.5 cm to 5 cm; and the plastic particle may preferably be a polypropylene (PP) particle, which may be a cylinder with a diameter of 0.5 cm to 3 cm and a height of 0.5 cm to 5 cm or may be a cuboid with a side length of 0.5 cm to 5 cm. The arrangement of the sponge or plastic particle provides an excellent carrier for the growth of microorganisms, accelerates the growth of microorganisms, increases a nitrification rate in the aerobic zone 4, and reduces a tank volume.

Exemplarily, a ratio of a volume of the filler in the aerobic zone 4 to a volume of the aerobic zone 4 may be 0.2 to 0.6.

Figure 6:
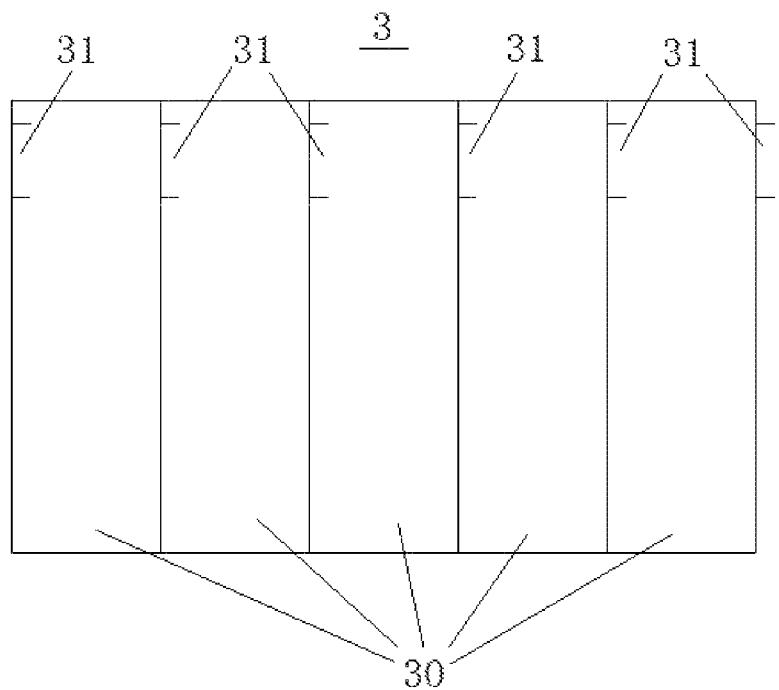
FIG. 6 is a schematic structural diagram of the anoxic zone.
Figure 7:
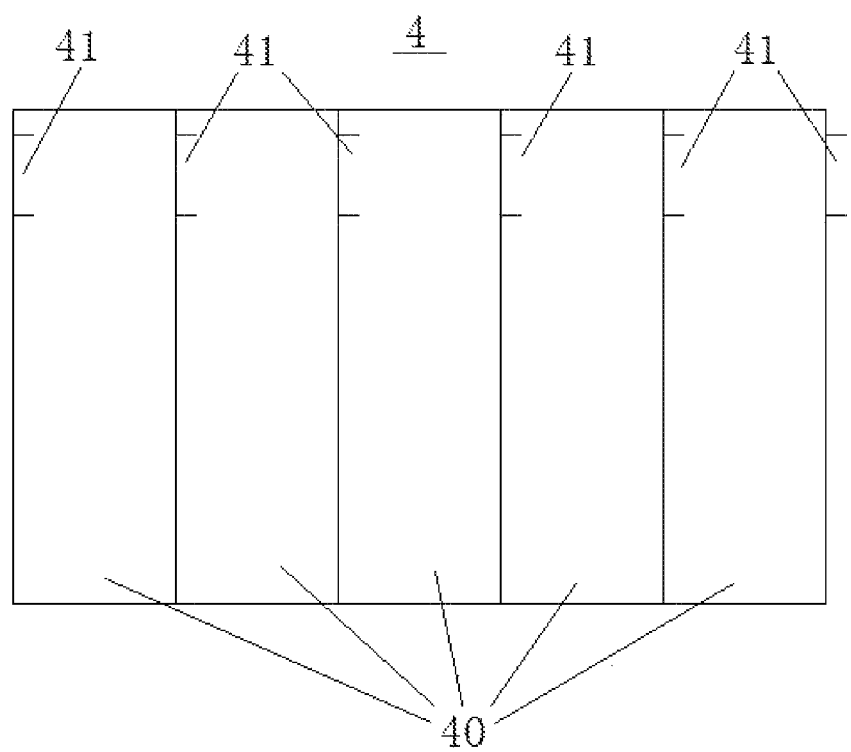
FIG. 7 is a schematic structural diagram of the aerobic zone.

Exemplarily, in order to arbitrarily change a ratio of the anoxic zone 3 to the aerobic zone 4 to adapt to influent water qualities of different regions and discharge standards of different regions, the anoxic zone 3 may be composed of at least one anoxic tank 30, and if there are two or more anoxic tanks, the two or more anoxic tanks may communicate with each other in sequence (as shown in FIG. 6); and the aerobic zone 4 may be composed of at least one aerobic tank 40, and if there are two or more aerobic tanks, the two or more aerobic tanks may communicate with each other in sequence (as shown in FIG. 7).

Figure 8:
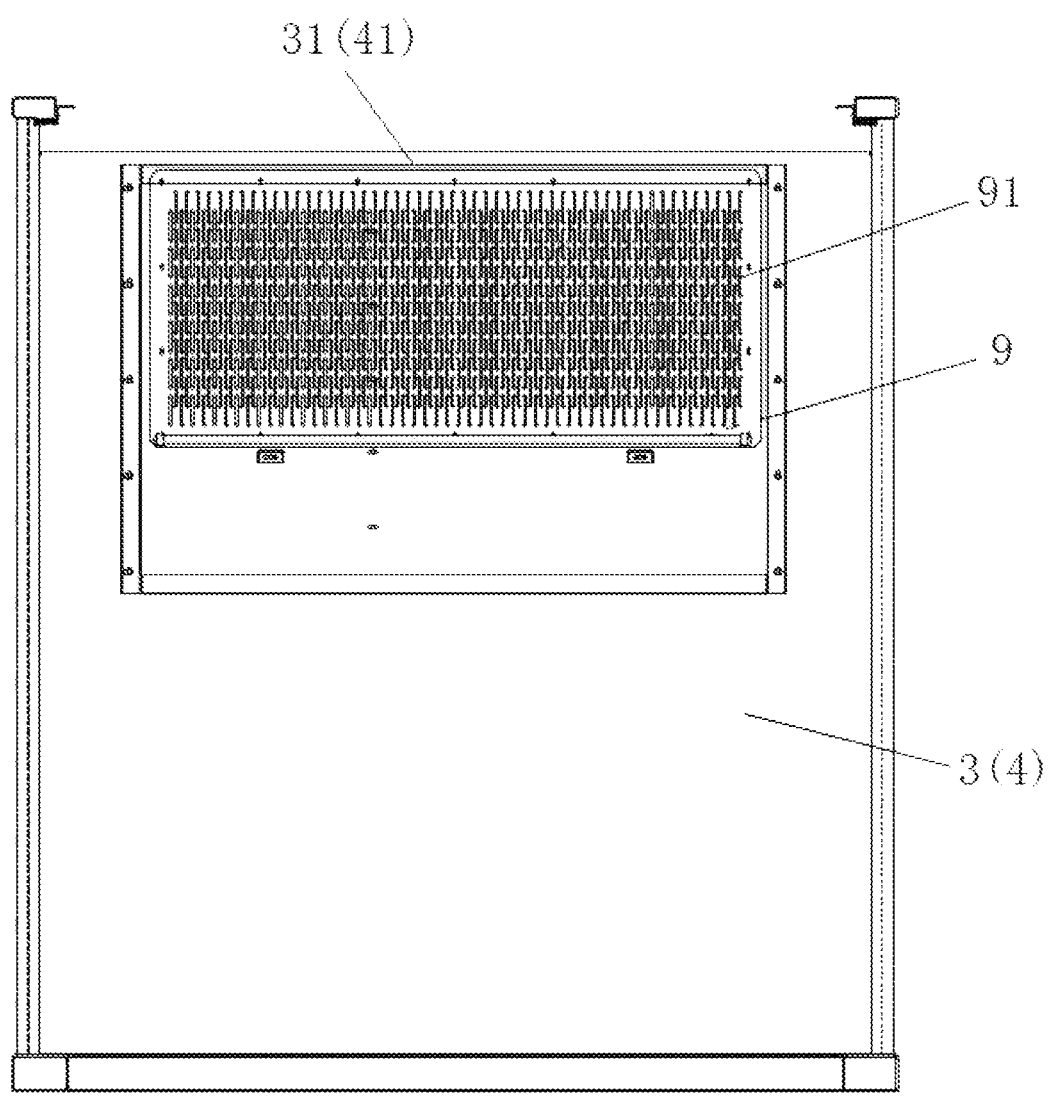
FIG. 8 is a schematic structural diagram of the filler baffle.

Exemplarily, as shown in FIG. 6 to FIG. 8, a water outlet 31 of the anoxic zone 3 and a water outlet 41 of the aerobic zone 4 may be both provided with a filler baffle 9; a strip hole 91 may be formed on the filler baffle 9; and the filler baffle 9 may be partly above a liquid level, which can effectively prevent the filler in the anoxic zone 3 from entering the aerobic zone 4 and thus prevent the filler from gathering and causing blockage.

Figure 4:
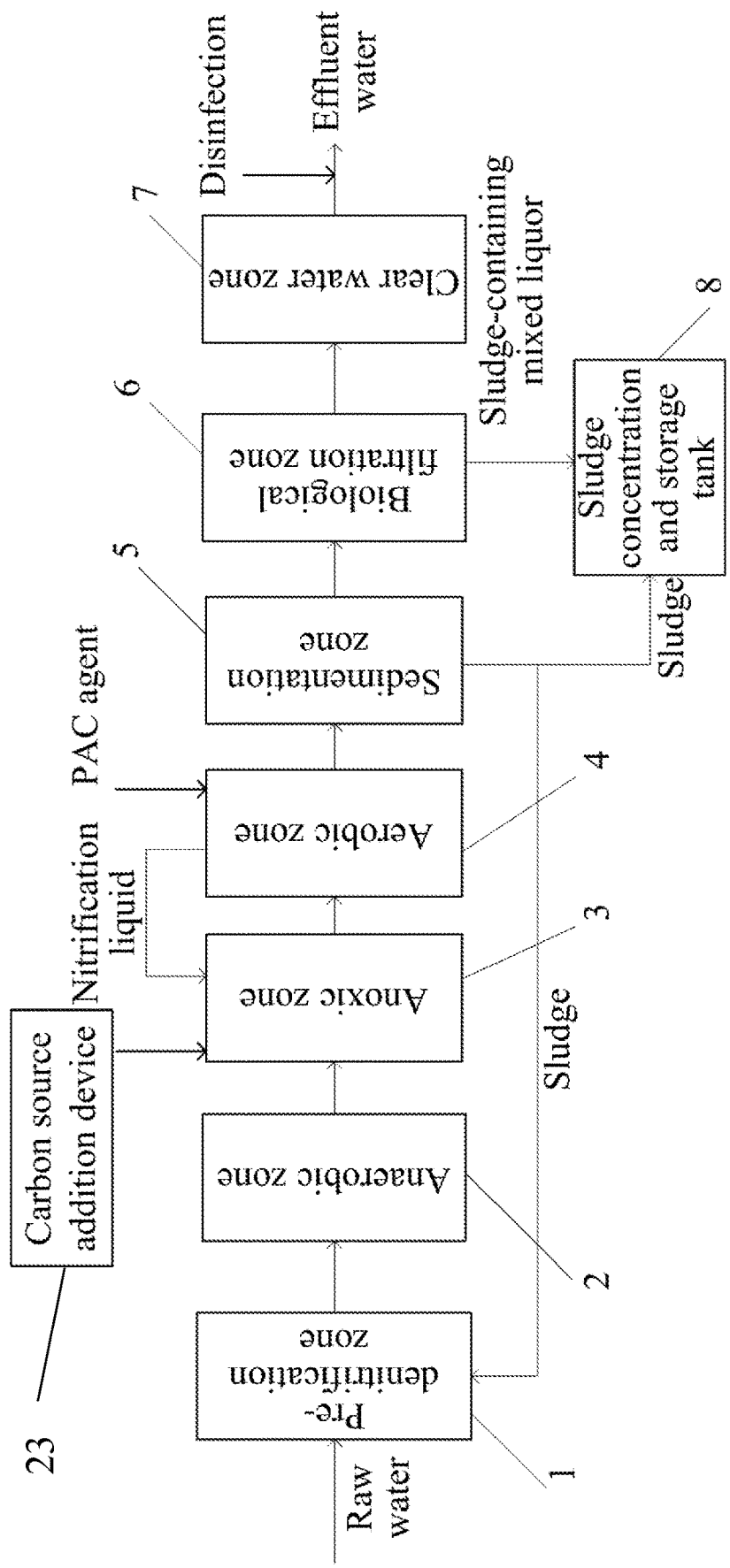
FIG. 4 is a process flow chart of the method for advanced nitrogen and phosphorus removal in sewage treatment provided by the present disclosure, where a PAC agent addition procedure, a carbon source addition procedure, and a disinfection procedure are added to the method.

Exemplarily, as shown in FIG. 4, a carbon source and a PAC phosphorus removal agent may be added at tail ends of the anoxic zone 3 and the aerobic zone 4, respectively, which can enhance the phosphorus and nitrogen removal effect in winter and enable effluent water of high total phosphorus influent water to meet standards stably.

Exemplarily, as shown in FIG. 4, in order to kill harmful pathogenic microorganisms in the effluent water and make the effluent water meet discharge standards, the clear water zone 7 may be provided with a tablet disinfection process or a UV disinfection process.

Exemplarily, as shown in FIG. 4, a carbon source addition device 23 may be provided at a head end of the anoxic zone 3 to facilitate the supplementation of a carbon source and ensure the stable operation of the system.

Figure 5:
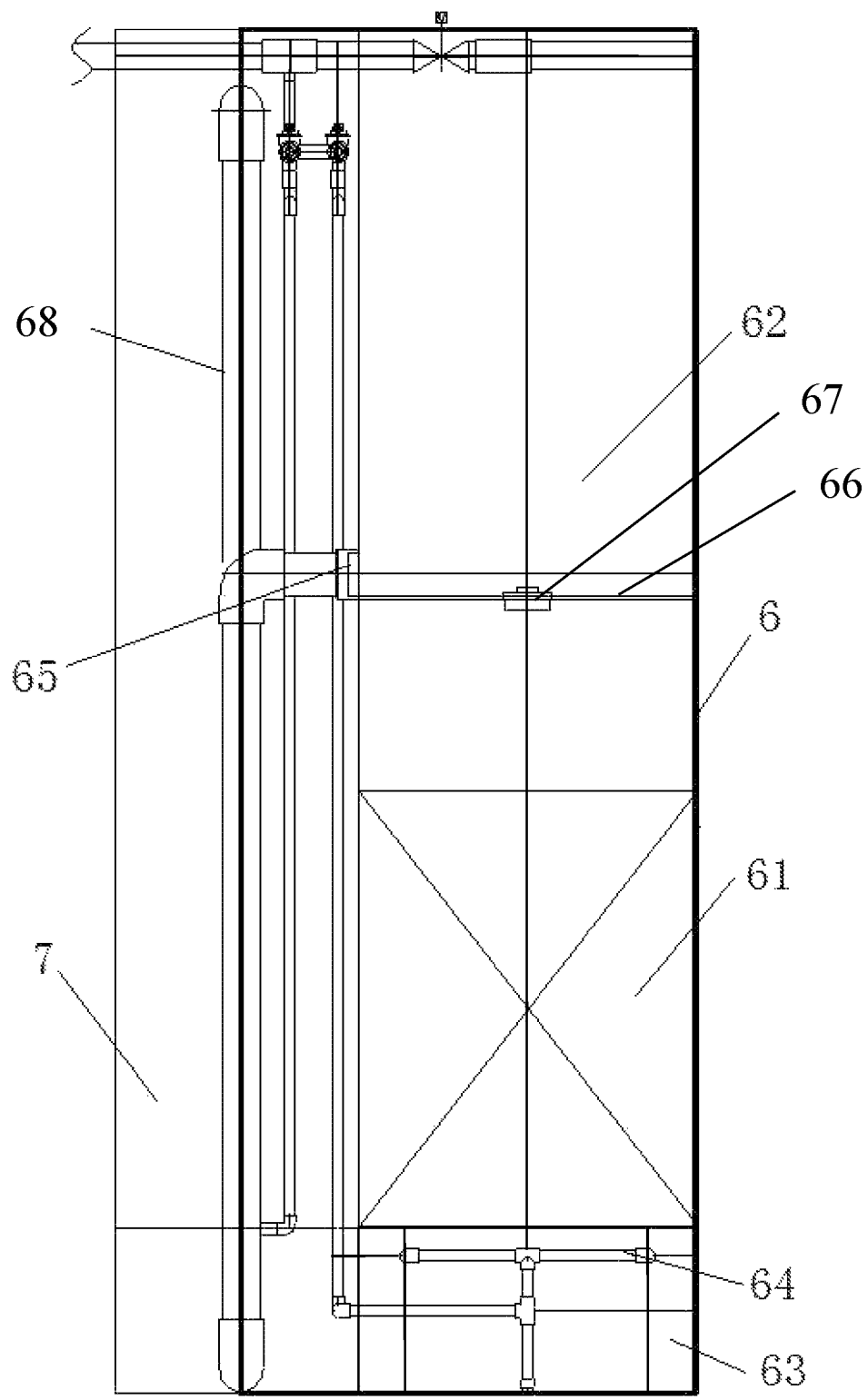
FIG. 5 is a schematic structural diagram of the biological filtration zone.

Exemplarily, as shown in FIG. 5, a filler layer 61 may be provided in the biological filtration zone 6, and the filler layer 61 may divide a cavity in the biological filtration zone 6 to form an upper water inlet cavity 62 and a lower water outlet cavity 63; the water inlet cavity 62 may communicate with a top of the sedimentation zone 5, and the water outlet cavity 63 may communicate with a bottom of the clear water zone 7; a backwash aeration pipe 64 may be provided in the water outlet cavity 63, and a backwash water outlet 65 may be formed in the water inlet cavity 62; the backwash water outlet 65 may be connected to a sludge concentration and storage tank 8 or the pre-denitrification zone 1; a height of the filler layer 61 may account for 20% to 70% of a height of the biological filtration zone 6; the filler layer 61 may be provided with an upper cover plate 66; and a filler feeding port 67 with a diameter of 90 mm to 400 mm may be formed on the upper cover plate 66, which is convenient for the addition and replacement of the filler. In operation: A supernatant in the sedimentation zone voluntarily flows from an upper part of the biological filtration zone 6 into the water inlet cavity 62 under gravity and thus is filtered through the filler layer 61. Filtered water flows from the water outlet cavity 63 into the clear water zone 7, thereby reducing an SS value of effluent water. In addition, aerobic microorganisms can grow adherently on a surface of the filler in the filler layer 61 and further remove organic matters and ammonia nitrogen in the raw water to reduce $COD_{cr}$ in effluent water. During backwash, the backwash aeration pipe 64 is opened to backwash the filler layer 61 to remove impurities trapped in the filler layer 61; a sludge-containing mixed liquor obtained after backwash in the water inlet cavity 62 can be returned through the backwash water outlet 65 to the pre-denitrification zone 1 and re-treated, and can also flow to the sludge concentration and storage tank 8 and stored; and clear water in the clear water zone 7 flows back to the water inlet cavity 62 due to a liquid level difference between the clear water zone 7 and the biological filtration zone 6 to be re-filtered and re-backwashed, thereby further reducing an SS value of effluent water and improving the filtration effect. In addition, a filtration process of the biological filtration zone 6 is simple and easy to operate, and does not require a water pump to provide a filtration power, nor a backwash pump to provide a backwash power, which is energy-saving and reliable.

Exemplarily, the filler in the filler layer 61 of the biological filtration zone 6 may preferably be a soft filler, such as a sponge. The soft filler has light weight and high hydrophilicity, will be fluidized with water, and is not easy to form a dead zone, and perforated aeration of the backwash aeration pipe can make the soft filler fully stirred. Moreover, under the action of a gas, a mud-water mixture in the soft filler can be squeezed out to complete the separation of the mud-water mixture and the filler, then the mud-water mixture is returned to the sludge concentration and storage tank or the pre-denitrification zone through the air stripping device, and the soft filler is fixed in the filler filling zone, thereby achieving the cleaning of the soft filler. Compared with a hard filler (such as a plastic particle), the soft filler achieves a better cleaning effect and requires low energy consumption. In addition, the soft filler also has excellent biological affinity and can provide a huge surface area, and thus the use of a sponge filler to absorb suspended matters in effluent water from the sedimentation tank can further remove SS and make SS in the effluent water stably less than 10 mg/L. Moreover, the sponge is conducive to the growth of aerobic microorganisms, which can further remove organic matters and ammonia nitrogen, and make a $COD_{cr}$ value of effluent water stably less than 30 mg/L and an ammonia nitrogen value of effluent water stably less than 1 mg/L, thereby meeting the discharge standards of surface water IV.

In this example, the sponge may preferably be a PU sponge, which may be a cube with a side length of 0.1 cm to 3 cm. In other examples, the filler in the filler layer 61 of the biological filtration zone 6 can also be a hard filler, such as a plastic particle (PP); and the plastic particle may be a cylinder with a diameter of 0.1 cm to 3 cm and a height of 0.1 cm to 5 cm or may be a cuboid with a side length of 0.1 cm to 3 cm.

Exemplarily, as shown in FIG. 5, in order to completely discharge sludge, the backwash water outlet 65 should be close to an upper surface of the filler layer 61.

Exemplarily, a solenoid valve may be provided at an air inlet end of the backwash aeration pipe 64, and the solenoid valve is provided to control a switch of the backwash aeration pipe; and the backwash may be conducted 1 to 5 times per day.

Exemplarily, the backwash water outlet 65 may be connected to the sludge concentration and storage tank 8 or the pre-denitrification zone 1 through an air stripping device 68; the pneumatic gas sources of the backwash aeration pipe 64 and the air stripping device 68 may be provided by the same air pump or fan; a switch of the air stripping device may be controlled by a solenoid valve; and media flowing through the valve and the pneumatic gas sources may be a gas, which will not directly contact the sludge, is not easy to be damaged, and has a long service life and a low cost.

Experimental results of conventional $A^2O$ water feeding, conventional water feeding in an improved $A^2O$ ($A^3O$)

process provided with a pre-denitrification zone, and A³O step feed are used as examples below to contrastively illustrate the beneficial effects of the present disclosure:

A²O water feeding: water is completely fed from the anaerobic zone 2; conventional A³O water feeding: water is completely fed from the pre-denitrification zone 1; and A³O step feed: pre-denitrification zone 1 water feeding/anaerobic zone 2 water feeding=1/9, a total water intake is about 30 m³/d. Experimental data are as follows:

TABLE 1

Comparison results of conventional A²O water feeding, conventional A³O water feeding, and A³O step feed

| | Item | Range for influent water (mg/L) | Mean value for influent water (mg/L) | Range for effluent water (mg/L) | Mean value for effluent water (mg/L) | Removal rate (%) |
|---|---|---|---|---|---|---|
| $COD_{cr}$ | A²O | 120-310 | 208 | 14-33 | 29 | 86.1% |
| | A³O conventional | 120-310 | 208 | 12-29 | 23 | 88.9% |
| | A³O step feed | 125-280 | 201 | 13-28 | 24 | 88.1% |
| TN | A²O | 40.1-55.3 | 51.1 | 13.6-17.5 | 16.3 | 68.1% |
| | A³O conventional | 40.1-55.3 | 51.1 | 12.4-15.9 | 14.5 | 71.6% |
| | A³O step feed | 41.5-58.2 | 55.1 | 10.9-14.6 | 12.8 | 76.8% |
| TP | A²O | 3.25-6.67 | 4.84 | 0.55-1.29 | 0.95 | 80.4% |
| | A³O conventional | 3.25-6.67 | 4.84 | 0.42-0.99 | 0.73 | 84.9% |
| | A³O step feed | 3.55-6.42 | 5.23 | 0.33-0.48 | 0.45 | 91.4% |

Note:
Concentrations for the influent and effluent water are expressed in a unit of mg/L.

It can be seen from the above table that, for influent water with low C/N and C/P ratios, the A³O or A³O step feed process can significantly improve the TN and TP removal effects compared with the A²O process. With the A³O step feed process, a TN removal rate reaches 76.8% and a TP removal rate reaches 91.4%.

For example, results obtained before and after a biological filtration zone 6 is added to the A³O process are compared below:

A³O step feed: pre-denitrification zone 1 water feeding/anaerobic zone 2 water feeding=2/8, a total water intake is about 30 m³/d. Samples are collected from an outlet of the sedimentation zone and an outlet of the biological filtration of the A³O device for a comparison test.

It can be seen from the above table that, compared with the use of the sedimentation module, the use of the biological filtration module achieves a higher pollutant removal efficiency and leads to effluent water reaching higher standards. When biological filtration is used, an SS concentration in effluent water is stably less than 10 mg/L, a $COD_{cr}$ concentration in effluent water is stably less than 30 mg/L, and an ammonia nitrogen concentration in effluent water is stably less than 1 mg/L, which meets the standards of surface water IV and can meet more stringent effluent water requirements in a specific place.

In summary, the implementation of the method for advanced nitrogen and phosphorus removal in sewage treatment according to the present disclosure for influent water with low C/N and C/P ratios can significantly improve the efficiency of nitrogen and phosphorus removal, such that a total phosphorus removal rate reaches 90%, a total nitrogen removal rate approaches 80%, effluent $COD_{cr}$ stably reaches 15 mg/L to 30 mg/L, effluent ammonia nitrogen is stably below 1 mg/L, and effluent SS is stably below 10 mg/L.

The examples disclosed above are only preferred examples of the present disclosure, and are not intended to limit the claimed scope of the present disclosure. Therefore,

TABLE 2

Comparison results of biological filtration of A³O process

| | Item | Range for influent water (mg/L) | Mean value for influent water (mg/L) | Range for effluent water (mg/L) | Mean value for effluent water (mg/L) | Removal rate (%) |
|---|---|---|---|---|---|---|
| $COD_{cr}$ | Sedimentation | 280-850 | 460 | 19-40 | 33 | 92.8% |
| | Biological filtration | 280-850 | 460 | 11-28 | 22 | 95.2% |
| Ammonia nitrogen | Sedimentation | 36.9-55.9 | 47.8 | 0.2-2.7 | 1.1 | 97.7% |
| | Biological filtration | 36.9-55.9 | 47.8 | 0.1-0.9 | 0.8 | 98.3% |
| SS | Sedimentation | 160-358 | 234 | 16-33 | 20 | 91.5% |
| | Biological filtration | 160-358 | 234 | 3-9 | 7 | 97.0% |

Note:
Concentrations for the influent and effluent water are expressed in a unit of mg/L.

The invention claimed is:

1. A method for advanced nitrogen and phosphorus removal in sewage treatment, comprising the following steps:
   a. feeding raw water into a pre-denitrification zone, or feeding the raw water into the pre-denitrification zone and an anaerobic zone through step feed;
   b. allowing sludge returned from a sedimentation zone to enter the pre-denitrification zone to undergo denitrification;
   c. allowing a sludge-containing mixed liquor obtained after the denitrification in the pre-denitrification zone to enter the anaerobic zone to undergo a biological phosphorus removal reaction;
   d. allowing a sludge-containing mixed liquor discharged from the anaerobic zone to enter an anoxic zone filled with a suspended filler, such that the sludge-containing mixed liquor is mixed with a nitrification liquid returned from an aerobic zone to the anoxic zone for denitrification;
   e. allowing a sludge-containing mixed liquor obtained after the denitrification in the anoxic zone to enter an aerobic zone filled with a suspended filler for organic matter degradation, ammonia nitrogen nitrification, and excessive phosphorus uptake, and allowing part of a nitrification liquid to be returned from the aerobic zone to the anoxic zone;
   f. allowing a sludge-containing mixed liquor discharged from the aerobic zone to enter the sedimentation zone for sedimentation to obtain a supernatant and sludge; filtering the supernatant through a biological filtration zone filled with a filler to further remove suspended solid particles; and returning part of the sludge from the sedimentation zone to the pre-denitrification zone, and discharging the remaining sludge outwards; and
   g. allowing clear water obtained after the filtration through the biological filtration zone to enter a clear water zone,
   wherein a filler layer is provided in the biological filtration zone, and the filler layer divides a cavity in the biological filtration zone to form an upper water inlet cavity and a lower water outlet cavity; the water inlet cavity communicates with a top of the sedimentation zone, and the water outlet cavity communicates with a bottom of the clear water zone; a backwash aeration pipe is provided in the water outlet cavity, and a backwash water outlet is formed in the water inlet cavity; and the backwash water outlet is connected to a sludge concentration and storage tank or the pre-denitrification zone.

2. The method for advanced nitrogen and phosphorus removal in sewage treatment according to claim 1, wherein the step feed comprises:
   feeding one part of the raw water into the pre-denitrification zone to provide a carbon source for denitrification of nitrate nitrogen in the raw water and return sludge; and
   feeding the other part of the raw water into the anaerobic zone in which the raw water is mixed with the sludge-containing mixed liquor obtained after the denitrification in the pre-denitrification zone for the biological phosphorus removal reaction.

3. The method for advanced nitrogen and phosphorus removal in sewage treatment according to claim 1, wherein the raw water entering the pre-denitrification zone accounts for 5% to 30% of the total raw water fed, and the raw water entering the anaerobic zone accounts for 70% to 95% of the total raw water fed.

4. The method for advanced nitrogen and phosphorus removal in sewage treatment according to claim 1, wherein the filler in the anoxic zone is a sponge or a plastic particle; the sponge is a cube with a side length of 0.5 cm to 5 cm; and the plastic particle is a cylinder with a diameter of 0.5 cm to 3 cm and a height of 0.5 cm to 5 cm, or the plastic particle is a cuboid with a side length of 0.5 cm to 5 cm.

5. The method for advanced nitrogen and phosphorus removal in sewage treatment according to claim 1, wherein the filler in the aerobic zone is a sponge or a plastic particle; the sponge is a cube with a side length of 0.5 cm to 5 cm; and the plastic particle is a cylinder with a diameter of 0.5 cm to 3 cm and a height of 0.5 cm to 5 cm, or the plastic particle is a cuboid with a side length of 0.5 cm to 5 cm.

6. The method for advanced nitrogen and phosphorus removal in sewage treatment according to claim 1, wherein a ratio of a volume of the filler in the aerobic zone to a volume of the aerobic zone is 0.2 to 0.6.

7. The method for advanced nitrogen and phosphorus removal in sewage treatment according to claim 1, wherein the anoxic zone is composed of at least one anoxic tank, and if there are two or more anoxic tanks, the two or more anoxic tanks communicate with each other in sequence; and the aerobic zone is composed of at least one aerobic tank, and if there are two or more aerobic tanks, the two or more aerobic tanks communicate with each other in sequence.

8. The method for advanced nitrogen and phosphorus removal in sewage treatment according to claim 1, wherein a water outlet of the anoxic zone and a water outlet of the aerobic zone are each provided with a filler baffle; a strip hole is formed on the filler baffle; and the filler baffle is partly above a liquid level.

9. The method for advanced nitrogen and phosphorus removal in sewage treatment according to claim 1, wherein the clear water zone is provided with a tablet disinfection process or an ultraviolet (UV) disinfection process.

10. The method for advanced nitrogen and phosphorus removal in sewage treatment according to claim 1, wherein a height of the filler layer accounts for 20% to 70% of a height of the biological filtration zone.

11. The method for advanced nitrogen and phosphorus removal in sewage treatment according to claim 1, wherein a filler in the filler layer is a sponge or a plastic particle; the sponge is a cube with a side length of 0.1 cm to 3 cm; and the plastic particle is a cylinder with a diameter of 0.1 cm to 3 cm and a height of 0.1 cm to 5 cm, or the plastic particle is a cuboid with a side length of 0.1 cm to 3 cm.

12. The method for advanced nitrogen and phosphorus removal in sewage treatment according to claim 1, wherein the filler layer is provided with an upper cover plate; and a filler feeding port with a diameter of 90 mm to 400 mm is formed on the upper cover plate.

13. The method for advanced nitrogen and phosphorus removal in sewage treatment according to claim 1, wherein a solenoid valve is provided at an air inlet end of the backwash aeration pipe.

* * * * *